(12) United States Patent
Figge et al.

(10) Patent No.: US 11,248,645 B2
(45) Date of Patent: Feb. 15, 2022

(54) FASTENER HAVING A DAMPING FUNCTION

(71) Applicant: BÖLLHOFF VERBINDUNGSTECHNIK GmbH, Bielefeld (DE)

(72) Inventors: Hans-Ulrich Figge, Schloß Holte-Stukenbrock (DE); Viktor Zelmer, Bielefeld (DE)

(73) Assignee: Böllhoff Verbindungstechnik GmbH, Bielefeld (DE)

( * ) Notice: Subject to any disclaimer, the term of this patent is extended or adjusted under 35 U.S.C. 154(b) by 479 days.

(21) Appl. No.: 16/313,315

(22) PCT Filed: Jun. 12, 2017

(86) PCT No.: PCT/EP2017/064267
§ 371 (c)(1),
(2) Date: Dec. 26, 2018

(87) PCT Pub. No.: WO2018/001710
PCT Pub. Date: Jan. 4, 2018

(65) Prior Publication Data
US 2019/0154073 A1 May 23, 2019

(30) Foreign Application Priority Data
Jun. 30, 2016 (DE) .......................... 102016112014.6

(51) Int. Cl.
*F16B 13/04* (2006.01)
*F16B 29/00* (2006.01)
(Continued)

(52) U.S. Cl.
CPC ............ *F16B 29/00* (2013.01); *F16B 5/0258* (2013.01); *F16B 37/067* (2013.01)

(58) Field of Classification Search
CPC ....... F16B 29/00; F16B 5/0258; F16B 37/067
(Continued)

(56) References Cited

U.S. PATENT DOCUMENTS 2,236,079 A * 3/1941 Wipper ................. F16B 37/067
411/38
3,013,643 A * 12/1961 Perry .................... F16B 5/0258
403/224
(Continued)

FOREIGN PATENT DOCUMENTS

CA 3010877 A1 8/2017
CN 1924376 A 3/2007
(Continued)

OTHER PUBLICATIONS

Written Opinion & International Search Report for PCT/EP2017/064267 dated Sep. 13, 2017, 12 pages.
(Continued)

*Primary Examiner* — Gary W Estremsky
(74) *Attorney, Agent, or Firm* — Reising Ethington P.C.; Matthew J. Schmidt (57) ABSTRACT

A fastener having a damping function with which at least a first and a second component can be connected via a screw connection. The fastener consists of the following components: an elastically deformable outer sleeve, a support sleeve arranged therein and a screw sleeve with telescopic portion arranged in the outer sleeve. When establishing the connection between the components, the outer sleeve folds, whereby the support sleeve and the screw sleeve are moved into each other.

21 Claims, 6 Drawing Sheets

(51) Int. Cl.
  *F16B 5/02* (2006.01)
  *F16B 37/06* (2006.01)

(58) Field of Classification Search
  USPC ............... 411/34, 38, 52, 60.2, 108, 111
  See application file for complete search history.

(56) References Cited

U.S. PATENT DOCUMENTS

| | | | | |
|---|---|---|---|---|
| 3,348,444 A * | 10/1967 | Brignola | ............... | F16B 19/10 |
| | | | | 411/38 |
| 3,479,081 A * | 11/1969 | Schaaf | ............... | F16F 1/3732 |
| | | | | 296/35.1 |
| 3,489,312 A * | 1/1970 | Hunckler | ............... | F16B 5/0258 |
| | | | | 220/235 |
| 3,534,797 A * | 10/1970 | Haug | ............... | F16B 37/043 |
| | | | | 411/108 |
| 3,646,982 A * | 3/1972 | Cushman | ............... | F16B 33/004 |
| | | | | 411/82.5 |
| 3,783,922 A * | 1/1974 | Petrus | ............... | F16B 37/044 |
| | | | | 411/111 |
| 3,834,270 A * | 9/1974 | Triplett | ............... | F16B 13/061 |
| | | | | 411/38 |
| 3,942,407 A * | 3/1976 | Mortensen | ............... | F16B 37/067 |
| | | | | 411/36 |
| 4,303,361 A * | 12/1981 | Moryl | ............... | F16B 37/042 |
| | | | | 411/108 |
| 5,096,349 A * | 3/1992 | Landy | ............... | B23P 9/025 |
| | | | | 411/108 |
| 5,106,225 A * | 4/1992 | Andre | ............... | F16B 5/0233 |
| | | | | 403/297 |
| 5,246,322 A * | 9/1993 | Salice | ............... | F16B 12/14 |
| | | | | 16/383 |
| 5,378,099 A * | 1/1995 | Gauron | ............... | B29C 70/68 |
| | | | | 411/108 |
| 6,029,942 A * | 2/2000 | Daddis, Jr. | ............... | F04B 39/0044 |
| | | | | 248/635 |
| 6,602,034 B2 * | 8/2003 | Wakai | ............... | F16B 13/061 |
| | | | | 411/37 |
| 7,393,169 B2 | 7/2008 | Süßenbach | | |
| 7,658,581 B2 | 2/2010 | Süßenbach | | |
| 7,780,387 B2 * | 8/2010 | Talpe | ............... | E05B 9/08 |
| | | | | 411/34 |
| 8,297,169 B2 * | 10/2012 | Kunda | ............... | F16B 5/025 |
| | | | | 89/36.11 |
| 9,709,085 B2 * | 7/2017 | McClure | ............... | F16B 19/1081 |
| 9,771,962 B2 | 9/2017 | Metten et al. | | |
| 9,945,410 B2 * | 4/2018 | Perrier | ............... | F16B 13/144 |
| 2007/0048106 A1 | 3/2007 | Christ et al. | | |
| 2008/0213065 A1 | 9/2008 | Sussenbach | | |
| 2011/0038685 A1 | 2/2011 | Christ et al. | | |
| 2013/0216328 A1 | 8/2013 | Leibfried et al. | | |

FOREIGN PATENT DOCUMENTS

| | | |
|---|---|---|
| CN | 103038102 A | 4/2013 |
| DE | 9001069 U1 | 5/1990 |
| DE | 9310735 U1 | 10/1993 |
| DE | 19836107 A1 | 2/2000 |
| DE | 20112171 U1 | 11/2001 |
| DE | 202005005536 U1 | 6/2005 |
| DE | 102004021484 A1 | 11/2005 |
| DE | 102006023320 A1 | 11/2007 |
| DE | 102007037242 A1 | 2/2008 |
| DE | 102007051778 A1 | 5/2009 |
| DE | 102007041949 B3 | 6/2009 |
| DE | 102012102906 A1 | 10/2013 |
| DE | 102013212101 A1 | 5/2014 |
| DE | 102012024653 A1 | 6/2014 |
| DE | 102014207554 A1 | 10/2015 |
| DE | 102016101910 A1 | 8/2017 |
| EP | 1710454 A1 | 10/2006 |
| GB | 2240603 A | 8/1991 |
| JP | 2003113825 A | 4/2003 |
| JP | 2004011876 A | 1/2004 |
| JP | 2007170645 A | 7/2007 |

OTHER PUBLICATIONS

CN Office Action for CN Application No. 201780046589.0 dated May 6, 2020 (8 pages).

English translation of the International Preliminary Report on Patentability for PCT/EP2017/064267 dated Jan. 1, 2019, (7 pages).

JP Office Action for JP Application No. 2018-568812 dated Feb. 4, 2020 (3 pages).

\* cited by examiner

FASTENER HAVING A DAMPING FUNCTION

1. TECHNICAL FIELD

The present disclosure relates to a fastener having a damping function with which at least a first and a second component can be connected via a screw connection. Further, the present disclosure relates to a connection of at least a first and a second component with the above-mentioned fastener as well as a connection method with which the components can be connected to each other by means of the fastener. In addition, the present disclosure relates to a manufacturing method for the above-mentioned fastener having a damping function.

2. BACKGROUND

In the prior art, various fasteners having a damping function are known. For example, DE 10 2007 041 949 B3 describes a fastener with direct screwing into one of the components to be connected. Here, in particular, a first and a second component are connected to each other, whereby a screw is screwed into a thread opening of the second component. In this way, the first component is clamped between the screw head and the first component. In order to dampen vibrations, the screw shaft is held in the passage or through-opening of the first component by an outer elastic damping sleeve and an inner support sleeve. The inner support sleeve prevents an excessive axial compression of the outer damping sleeve. Thus, the damping properties of the outer damping sleeve are maintained while at the same time a firm connection between the screw and the second component is ensured. However, if the second component does not provide the thickness or material stability that is necessary for a screw connection, this construction of a fastener is not applicable. Further, the first component is held in a rather loose frictionally engaging fit between the radial collar of the damping sleeve and the second component. While this arrangement allows the vibration damping of vibrations in the second component, it is generally aimed at fastening a possibly vibrating part to a fixed component, such as a vehicle frame. This limits the range of applications for this fastener.

DE 10 2006 023 320 A1 describes the connection of at least two components by means of a screw blind rivet consisting of plastic. This screw blind rivet has the shape of a square or other polygonal tube and is inserted into an appropriately shape-adapted opening in the first and second component. By screwing in a self-cutting screw, the screw blind rivet folds transversely to its longitudinal direction and in this way clamps the components to be fastened to each other between the screw head and the folding of the screw blind rivet. Although a sufficient stability for fastening two components is provided by the screw blind rivet disclosed here, which however excludes at the same time a reliable vibration damping in the context of this connection. Although the screw blind rivet consists of plastic, no damping properties are attributed to it. Only the dimensional stability of the plastic used here maintains the positive locking between the screw blind rivet and the opening in the first and second component adapted to the outer contour of the screw blind rivet. Here, the screw blind rivet resists any deformation, e.g. against torsion, due to the screwing-in of the screw into an engagement section of the screw blind rivet. Although a quick connection with a manageable amount of parts and construction effort is provided by the screw blind rivet disclosed herein, the connection does not withstand a load from vibrations due to a lack of damping properties. Depending on the type, frequency range and direction of the vibration, these lead at least to a rapid weakening of the connection established herein or contribute to an unfavorable transmission of such vibrations, for example as disturbing noise.

EP 1 710 454 A1 describes another fastener in the form of a blind rivet. This blind rivet consists of an elastic outer body with a sleeve-shaped shaft, which can be inserted into a fastening hole of a carrier part. A metallic threaded bushing is arranged within the passage opening of the elastic outer body. This metallic threaded bushing is located in an axial end portion of the elastic outer body facing away from a screw-in opening of the elastic outer body for a screw. Since the metallic threaded bushing is connected firmly to the outer body, a screwing of a screw into the thread of the metallic threaded bushing causes an axial displacement of the metallic threaded bushing and thus of the axial end portion of the outer body facing away from the component in the direction of the carrier parts to be connected. A folding of the elastic outer body resulting from this displacement encloses the carrier part in a damping manner. In addition, the metallic threaded bushing is pulled against the other component in order to support itself there. Although the outer body provides good damping properties due to its elastic material properties, the former are at the same time accompanied by a lack of stability against torsional load when screwing in the fastening screw. This can lead to a torsion of the outer body within the opening of the carrier part, which reduces the radial extension of the outer body and thus weakens the connection to be established. In addition, pulling the threaded bushing into the opening of the carrier part can also damage the elastic outer body, especially if the threaded bushing is not aligned centrally with respect to the opening in the carrier part. Since such damage is usually present on the interior of the elastic outer body, it is not visible from the outside and initially manifests itself in a reduced lifespan of the blind rivet disclosed herein.

With regard to the above-described disadvantages of the prior art, it is therefore an object of at least some embodiments of the present invention to provide a fastener having a damping function which, regardless of its simple construction, provides a sufficient vibration damping and lifespan.

3. SUMMARY

The above may be achieved by a fastener having a damping function, by a connection of at least a first and a second component with the above-mentioned fastener, by a connection method of the at least one first component with a rotationally asymmetric opening and of the at least one second component by means of the above-mentioned fastener and by a manufacturing method for the fastener as set forth in this disclosure. Further designs and further developments are set forth in the following description, the accompanying drawings and the claims.

The fastener having a damping function with which at least a first and a second component can be connected via a screw connection comprises the following features: an elastically deformable outer sleeve having a screw-in opening in a first axial end portion and a screw-in portion for a screw in a second axial end portion, wherein the outer sleeve has, at least in the first axial end portion, a rotationally asymmetrical circumferential contour with which a positive locking against rotation can be established in a component opening adapted to the circumferential contour of the outer sleeve, and a rotationally asymmetrical support sleeve, which is positive-lockingly arranged against rotation relative to the outer sleeve within the outer sleeve in the first axial end portion, so that the circumferential contour of the elastically deformable outer sleeve is supported in the first axial end portion at least in certain areas in a form-maintaining manner, and which is positive-lockingly connected to the fastening section arranged firmly in the second axial end portion against a relative rotation between the first and the second axial end portion of the outer sleeve.

The present disclosure provides a vibration damping fastener which realizes a reliable connection and at the same time effective vibration damping by means of the combination of positive locking with the components to be connected, radially inner stabilization and support of this positive locking as well as radially outer elastically damping material arrangement. Additional elasticity of the deformable outer sleeve for vibration damping is provided by an outer contour of the outer sleeve which allows a positive locking. That is because the outer contour of the outer sleeve is adapted to the form of the receiving opening in at least one of the components to be connected with each other. While this circumferential contour of the outer sleeve, which supports a positive-locking and is thus rotationally asymmetrical, ensures a hold of the outer sleeve in the component which is stabilized against rotation, this construction and function is facilitated by a support sleeve formed analogously thereto within the outer sleeve. Due to the axial arrangement and the preferably matching or analogous form design of the outer sleeve and the support sleeve, the support sleeve acts form-maintaining on the outer sleeve even without a folding of the outer sleeve. Notwithstanding the elastic material of the outer sleeve for vibration damping, the fastener should also provide sufficient torsional stability in order not to be damaged or destroyed during its installation. This could occur if the outer sleeve would be excessively inherently twisted when the fastening screw is screwed into the fastening section. Such twisting damages the outer sleeve and/or leads to a reduced elasticity of the material of the outer sleeve. Thus, a positive locking against rotation is provided between the fastening section and the support sleeve. Since the support sleeve is held against rotation in the first axial end portion of the outer sleeve, the positive locking between the support sleeve and the fastening section prevents the fastening section from co-rotating when the fastening screw is screwed into the fastening section. In this way the screwing torque of the fastening screw, which is transmitted to the fastening section by frictional engagement, is induced into the second component via the support sleeve and the first axial end portion of the outer sleeve. Alternatively or combined with this, it may be preferred to transmit the screwing torque to the second component via the support sleeve and a fastening flange. Due to this internal construction of the fastener, the outer sleeve is protected against torsion to maintain its damping material properties. Here, it may be preferred to limit a twisting of the outer sleeve about its longitudinal axis to an angle of rotation of maximum 180°, preferably maximum 90°, and further it may be preferred to prevent it completely. Thus, the fastening section, preferably a screw sleeve described in more detail below, and the support sleeve as well as the support sleeve and the first axial end portion of the outer sleeve are connected in a rotation-proof manner to each other by means of the second component. In this context, rotation-proof indicates that a relative rotation between two connected elements is limited to a maximum rotation angle or is completely prevented.

It is further preferred that the fastening section is arranged rotation-free, preferably completely rotation-free, at least with a subportion radially within the support sleeve. In addition, the subportion of the fastening section can be displaced in the axial direction of the support sleeve relative to the support sleeve.

The fastening section may be functionally built in two parts. A first functional part accommodates a thread of a fastening screw, preferably a self-cutting or a self-tapping thread. A second functional part is constructively designed in such a way that the fastening section is connected to the support sleeve in a rotation-proof manner. This rotation-proof connection at the same time allows an axial displacement of the interconnected support sleeve and the fastening section relative to each other. This may be realized by means of a telescope-type connection between the support sleeve and the fastening section. In this, the telescopic elements are designed non-uniformly in a circumferential contour so that a twisting of the telescopic elements to each other is prevented. In addition, it may be preferred to allow the fastening section to engage via webs in openings intended for this purpose in the support sleeve or vice versa. This engagement connection is rotation-proof and at the same time allows an axial displacement between the support sleeve and the fastening section.

According to a further embodiment of the fastener, the outer sleeve comprises in the first axial end portion a radial collar and in the second axial end portion opposite the first a fixedly arranged screw sleeve, which comprises the screw-in portion in which a thread of the screw can be received.

Due to the axial extension of the outer sleeve, the latter can be divided into a first axial end portion and a second axial end portion. The first axial end portion is adjacent to a screw-in opening for the fastening screw. In the second axial end portion, the screw-in portion is preferably provided, preferably a nut section or a section for cutting or tapping a thread.

The screw-in portion may be realized by a screw sleeve. The screw sleeve, in accordance with different embodiments, is formed integrally in the outer sleeve, is glued into, pressed in or held rotation-proof with or without clearance as a separate part within the outer sleeve.

It may be preferred to provide a folding portion in the axial direction between the first axial end portion and the second axial end portion of the outer sleeve. As soon as a screw is screwed into the fastening portion and the second axial end portion thereby moves in the direction of the first axial end portion, a radially outwardly projecting folding occurs in the folding portion. After the fastener has been fully fastened, this folding is supported at least at the at least one first component. The mentioned radial collar may act as a supporting and damping intermediate layer between the two first and second components arranged opposite each other. According to a further embodiment, this radial collar is preferably used to hold the support sleeve in a captive manner if the fastener has not yet been installed. For this purpose, the support sleeve may comprise a fastening flange which can be arranged and/or latched in a shape- or form-adapted recess of the fastening flange. Since the outer contour of the support sleeve matches the form of the inner contour of the outer sleeve and the outer sleeve matches in turn the shape of the asymmetrical opening in the second component, the outer sleeve resists a torque from the fastening section via this constructive connection. That is because the torque from the fastening section is diverted into the component. As a result, the first axial end portion and the second axial end portion of the outer sleeve are not or only insignificantly twisted against each other, similar to a rotation-proof connection.

This stabilization of the outer sleeve may be achieved by arranging the fastening flange of the support sleeve in the shape-adapted opening of the radial collar. During the installation of the fastener, the fastening flange is held rotation-proof in or at the radial collar. In addition, the radial collar provides, via its abutment face at the second component adjacent to the component opening, a rotation-proof frictionally engaging connection between the radial collar of the outer sleeve, the support sleeve and the second component. This connection limits, preferably prevents, also a rotation of the support sleeve with respect to the fastening section and the second axial end portion.

It is further preferred that the fastener in the screw sleeve comprises a screw channel extending coaxially to the outer sleeve, which is formed cylindrically or conically tapered in a screw-in direction. This screw-in channel may form the constructive basis so that the screw to be screwed in can independently cut and/or tap a thread in it. It may be preferred to provide a nut thread in this screw channel which matches the fastening screw. In order to be able to adjust a certain screw-in torque of the fastening screw and also a preferred loosening torque of the fastening screw after establishing the connection, the threads of the fastening screw and the nut element are matched to each other accordingly.

According to another embodiment of the fastener, the screw sleeve comprises an radial outer contour at least two-stepped in the axial direction including a fastening portion facing away from the support sleeve and a telescopic portion facing the support sleeve, wherein the telescopic portion has a smaller radial extension than the fastening portion and an inner axial channel of the support sleeve. The telescopic portion of the screw sleeve is moved into a nested arrangement with the outer sleeve and the support sleeve during the folding of the elastically deformable outer sleeve and thus during the tightening of the fastening screw. This nested construction ensures both an axially compact arrangement and additional radial stability, as inner interspaces in the fastener are closed by means of a multi-component support, thus being optimized for load relief. In this context, preferably the fastening portion and the telescopic portion of the screw sleeve are stepped and connected via the axial abutment face.

According to a further embodiment of the fastener, an outer contour of the telescopic portion of the screw sleeve is adapted in shape to an inner contour of a radial inner wall of the support sleeve, so that the support sleeve blocks the screw sleeve against rotation and the outer sleeve can be compressed in axial direction torsion-free about a longitudinal axis, preferably torsion-free about a rotation angle<180° or almost completely torsion-free. Further, the support sleeve is formed shorter than the outer sleeve.

In order to realize a positive locking between the fastener and an opening in the first component, the outer sleeve may comprise a non-circular or elliptical or a polygonal, hexagonal or octagonal, circumferential contour. To support this circumferential contour, which produces a positive locking, of the elastically deformable outer sleeve, an inner wall contour of the outer sleeve may be formed analogously to the circumferential contour, as already mentioned above. This ensures the radial support of the outer sleeve by means of the rotationally asymmetrical support sleeve arranged in its interior. That is because, according to another preferred embodiment of the present invention, the support sleeve is formed to match the inner wall contour of the outer sleeve. Since, according to a preferred embodiment, the support sleeve abuts against the inner wall of the elastically deformable outer sleeve, the support sleeve, due to its lower deformability than the outer sleeve, contributes to the dimensional stability of the outer sleeve within an opening in the first component adapted to the circumferential contour. This ensures vibration damping due to the elastically deformable material of the outer sleeve as well as a positive locking hold of the outer sleeve within a shape-adapted opening of the first component at the same time. In this context, it is also supportively preferred that, at a radial outer wall, the support sleeve is formed to match the inner wall contour of the outer sleeve.

According to a further embodiment of the fastener, the support sleeve provides an axial abutment face in the direction of the second axial end portion at the fastening portion, which limits an axial shortening of the outer sleeve and an accompanying folding transverse to a longitudinal axis of the outer sleeve by the screw connection.

While the support sleeve acts in a form-maintaining manner radially outwards on the circumferential contour of the elastically deformable outer sleeve, it provides at the same time an axial stabilization and support function for the fastener. That is because the deformable outer sleeve is compressed to a maximum up to the preferred axial abutment face of the support sleeve in the fastened state and is thereby folded. By the axial support of the support sleeve, an additional excessive surface pressure of the folded outer sleeve, its possible damaging or a plastic deformation of the outer sleeve is prevented. In addition, an increasing torque when installing the fastener signals the worker that the components are now fixedly connected to each other. This can be used to automatically terminate the installation procedure.

The present disclosure also describes a connection of at least a first and a second component with the fastener described above in accordance with its different preferred embodiments, in which a screw connection holds the components and the fastener together. In this context, it is preferred that the at least one component comprises a rotationally asymmetrical opening adapted to the rotationally asymmetrical circumferential contour of the outer sleeve, so that a positive locking against rotation can be established between the at least one component and the elastically deformable outer sleeve. According to a further embodiment of the connection, the at least one first component is held between the radial collar and a folding of the elastically deformable outer sleeve and the at least one second component is held between the radial collar and a head of a screw screwed into the fastener.

The present disclosure further comprises a connection method of at least one first component having a rotationally asymmetric opening and at least one second component by means of the fastener described above, wherein said connection method comprises the following steps: inserting the fastener into the opening of the at least one first component so that the fastener is held in a positive-locking manner against rotation in the opening, arranging the at least one second component with a fastening opening adjacent to the fastener and screwing a screw into the fastener and through the fastening opening and the opening of the components until the first component is fastened between a radial collar and a folding of the outer sleeve and the second component is fastened between a head of the screw and the radial collar of the outer sleeve.

Within the scope of the connection method, when the fastening screw is screwed in, the outer sleeve is also shortened until the support sleeve supports itself at an axial abutment face of the screw-in portion of the outer sleeve. This support in the axial direction facilitates a stabilization of the fastener parallel to the screwed-in fastening screw. In this context, it is may be that a thread-cutting or thread-tapping screw is screwed into a screw-in portion of the outer sleeve. The screw-in portion to be provided in this context without its own thread for direct screwing is associated with a reduced manufacturing effort, especially with regard to the provision of a nut section. At the same time, however, the use of a thread-cutting or thread-tapping screw ensures a clamping effect between the fastening screw and the screw-in portion of the outer sleeve which supports the connection between the two components.

The connection method is further characterized in that when the fastening screw is screwed into a fastening section in the second axial end portion of the outer sleeve, the fastening section is positive-lockingly held against rotation in the support sleeve and is displaced in the axial direction of the support sleeve within the support sleeve. At this, the outer sleeve may shorten until the support sleeve supports itself at an axial abutment face of the screw sleeve.

The present disclosure also describes a manufacturing method for the fastener described above. This manufacturing method includes the following steps: Manufacturing an outer sleeve from an elastically deformable material having a rotationally asymmetric circumferential contour by means of an injection molding method or an additive manufacturing method, manufacturing a screw sleeve and fastening the screw sleeve in the outer sleeve, injection molding a rotationally asymmetric support sleeve adapted in shape to the outer sleeve, which consists of a material having a lower deformability than the outer sleeve, by means of an injection molding method or an additive manufacturing method, and arranging the support sleeve in the outer sleeve.

According to an embodiment, the fastener is manufactured by injection molding. According to an alternative, the outer sleeve, the support sleeve and the screw sleeve are injection molded separately from one another and subsequently assembled together. In the further course of the procedure, the screw sleeve is pressed into, glued in, welded in or fastened in a positive-locking manner with a certain clearance in the second axial end portion of the outer sleeve.

According to a further manufacturing route, an additive manufacturing method is used instead of the above-mentioned injection molding method. For additive manufacturing methods, the material is added layer by layer to produce a component. With the aid of this layered construction method, geometrically complex structures can be manufactured, which can be realized only with great effort when using conventional manufacturing methods. In extrusion methods, a plastic thread or plastic string is melted through a heated nozzle and placed geometrically defined. By placing straight to the point individual strands of material layer by layer with positional accuracy, the desired component is created. Powder-based methods are also preferred. Here a powdered starting material is applied to the work surface in a thin layer and is then melted straight to the point. The energy is supplied straight to the point by means of a laser, wherein the material is melted and connects with adjacent layers/structures during solidification. When one layer is finished, another thin layer of fresh powder is applied and the procedure begins all over again. The laser method can be used for plastics (plastic laser-sintering) in the same way as for metals (laser beam melting).

It is further preferred that at least the outer sleeve and the screw sleeve are manufactured in a two-component (2K) injection molding method. The term two-component injection molding (2K injection molding) describes those methods in which two different plastic types or plastic modifications are connected to each other by injection molding in one process. Different plastic modifications refer to the same type of plastic, but with different fillers, such as dyestuffs (multi-color injection molding), reinforcing or fiber material of known plastics, such as glass fibers, different proportions of reinforcing material or different plasticizers or different proportions of the latter. This type of primary forming holds great potential for cost optimization and rationalization, because complex parts with several functional requirements (e.g. several colors, hard/soft, etc.) can be produced in a single working step without extensive reworking. In this method, two different plastics are injected with a time delay into one injection mold to manufacture a part consisting of two components. It is also possible to insert the same plastic into the injection mold in two or more shots with a time delay. The components created by the respective shot are formed in an adjacent arrangement in the injection mold without flowing into each other. Thereby, it is also preferred that the cavities of the injection mold, which are separated from each other, are filled with the same or different plastics at the same time or with a time delay in order to form the above-mentioned components. The several components, the support sleeve and the outer sleeve or the support sleeve and the screw sleeve, may be connected to each other via a plurality of tear-off webs. Tear-off webs refer to web-like bridges between the plastic parts which, due to their small diameter, can be severed without mechanical effort. Based on this, the support sleeve and the screw sleeve can be installed as a unit in the outer sleeve. Only when the fastener is inserted into the component opening or when the screw is screwed into the fastener the webs between support sleeve and screw sleeve are fractured or broken so that the support sleeve and the screw sleeve are separated from each other and are present as separate components in the fastener.

According to a further manufacturing alternative, the support sleeve and the screw sleeve are manufactured as a detachable composite, whereby the composite is realized by frictional engagement between the support sleeve and the screw sleeve or by destroyable connection webs.

4. BRIEF DESCRIPTION OF THE ACCOMPANYING DRAWINGS

The embodiments of the present disclosure are described in more detail with reference to the accompanying drawing. It shows.

5. DETAILED DESCRIPTION

With reference to FIGS. 1 to 12, embodiments of the fastener 1 will be described below.

Figure 1:
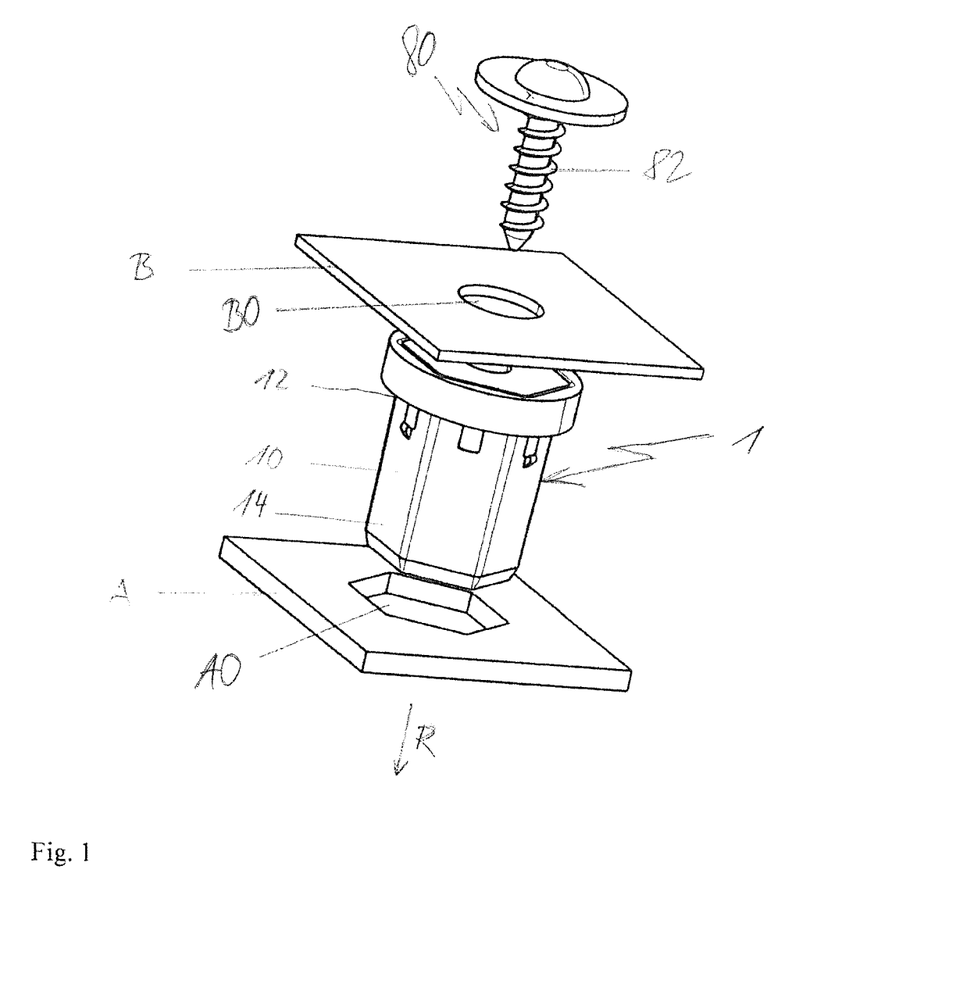
FIG. 1 is a perspective side view of an exploded view of an embodiment of the fastener in combination with a first and a second component.

The fastener 1 establishes a connection between at least one first component A and at least one second component B. Due to the material properties of an elastically deformable outer sleeve 10 of the fastener 1, which is arranged in an opening AO of component A, the two components A and B are vibrationally decoupled or noise decoupled from each other. In order to be able to damp a wide frequency range or a selected frequency range of vibrations in an application area of the fastener 1, the elasticity of the material of the outer sleeve 10 can be specifically selected or can be specifically selected in the manufacturing of the fastener 1. In this context, the overall construction of the fastener 1 allows soft elastic materials to be used in the same way as harder materials. According to the invention, the outer sleeve 10 may consist of elastically softer material than the components arranged inside the outer sleeve 10 of the fastener 1, such as a support sleeve 30 or a screw sleeve 50.

Figure 12:
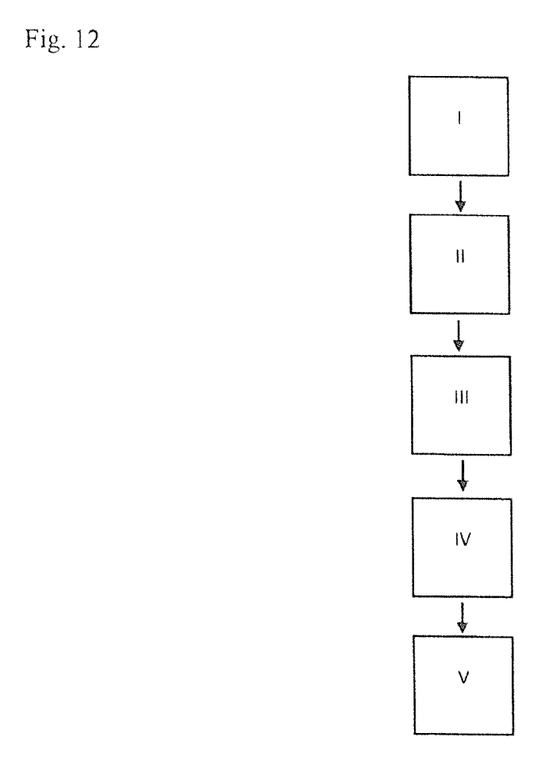
FIG. 12 is a flow chart of an embodiment of a manufacturing method of the fastener.

The outer sleeve 10 manufactured by an injection molding method may consist of plastic (step I of the manufacturing method). The plastic may be a polyester-based elastomer, in particular polybutylene terephthalate (PBT) or polyethylene terephthalate (PET). Although these materials are elastically deformable, they have a relatively high Shore hardness (in the Shore D range) and excellent dimensional stability under heat (150° C. and more). In addition, they offer good chemical resistance, especially diesel oil resistance. Cross-linked elastomers such as rubber/gum elastic are also possible. In addition, the outer sleeve 10 is preferably made of thermoplastic elastomers (TPE), thermoplastic polyolefin vulcanizates (TPV), compounds of both or of silicones by means of injection molding.

Figure 2:
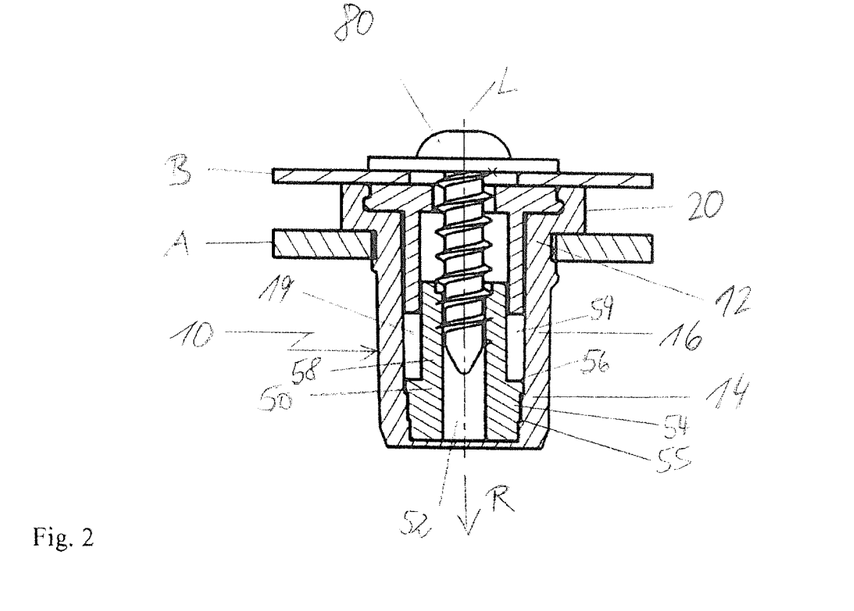
FIG. 2 is an illustration of an embodiment of the fastener in combination with the first and second components in an axial section along a central axis of the fastener with the fastening screw in the untightened state.
Figure 3:
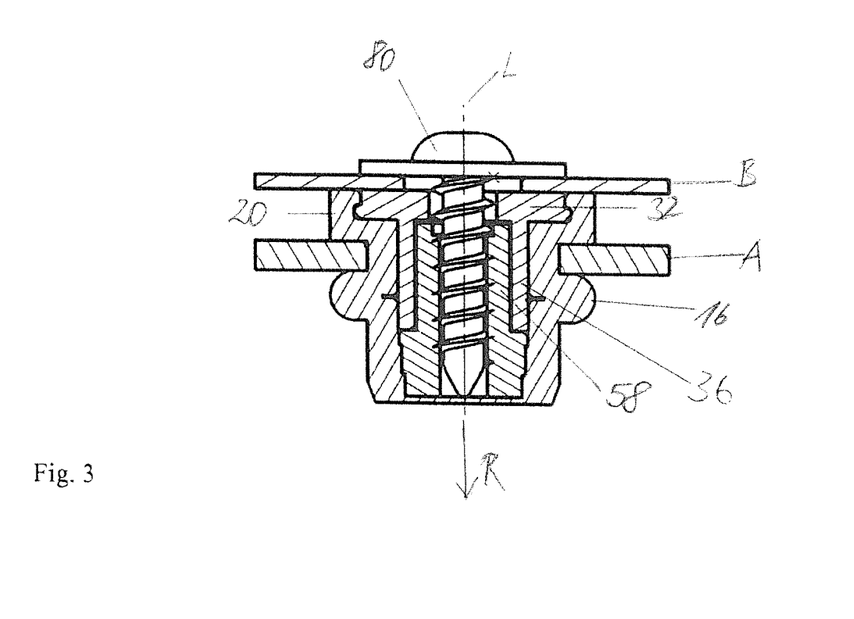
FIG. 3 is the fastener according to FIG. 2 with the fastening screw in the tightened state.
Figure 4:
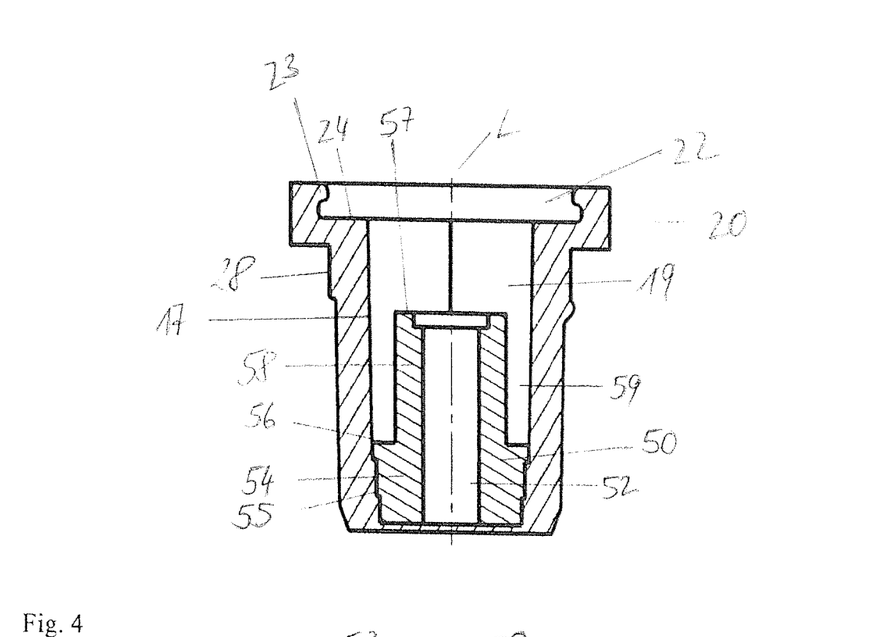
FIG. 4 is an embodiment of an axial longitudinal section through the elastically deformable outer sleeve with a screw sleeve.
Figure 5:
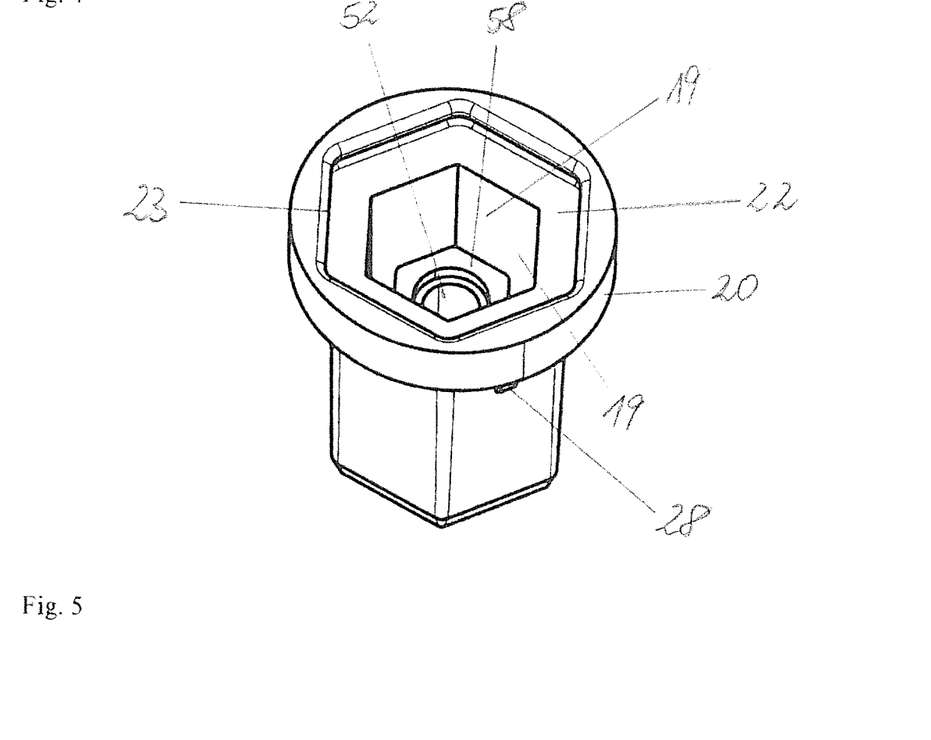
FIG. 5 is a perspective top view of an embodiment of the elastically deformable outer sleeve and into the first axial end portion.
Figure 6:
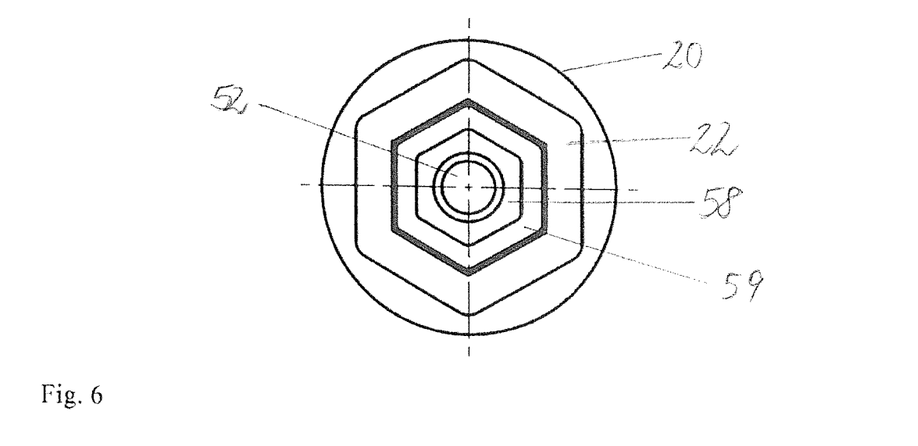
FIG. 6 is a view in the screw-in direction of an embodiment of the elastically deformable outer sleeve with screw sleeve.

The outer sleeve 10 may comprise an axially extending section with a first 12 and a second axial end portion 14. Between the first 12 and the second end portion 14 a folding portion 16 is arranged, as can be seen in the comparison of FIGS. 2 and 3.

Figure 10:
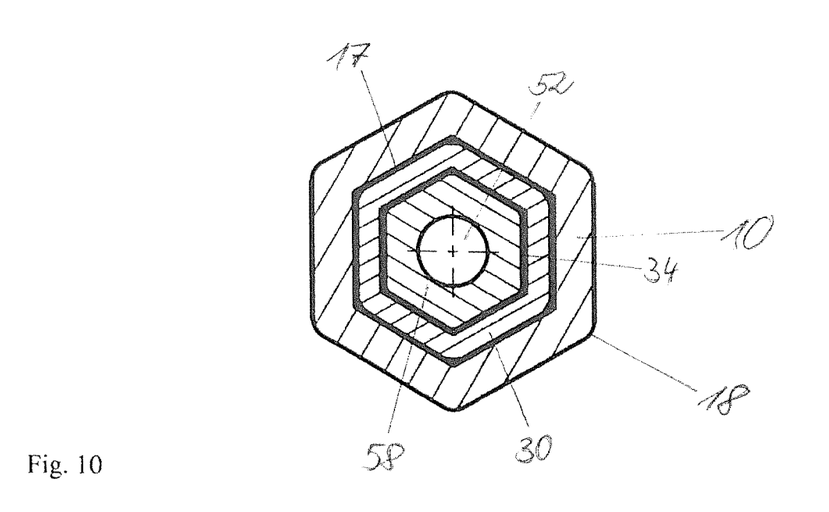
FIG. 10 is a cross-sectional view through the fastener along line A-A of FIG. 9.
Figure 11:
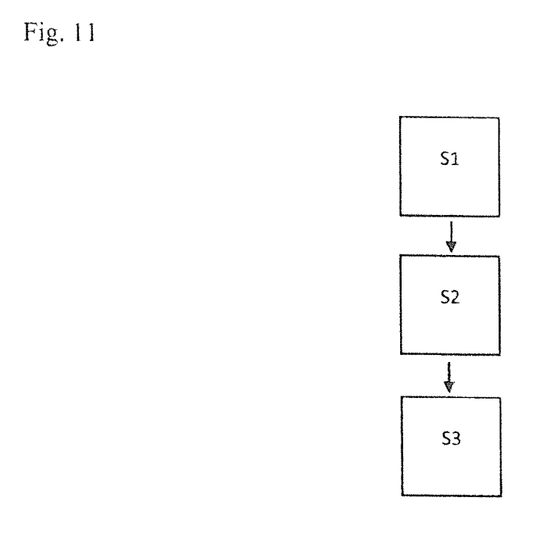
FIG. 11 is a flowchart of an embodiment of a connection method.

The axially extending section 12, 14, 16 comprises at least in an axial subportion a rotationally asymmetrical circumferential contour 18, as can be seen from the sectional view in FIG. 10. FIG. 10 shows a section along line A-A through fastener 1 of FIG. 9. Preferably this subportion is arranged in the first axial end portion 12. This ensures that the subportion extends into the opening AO of component A to form a positive locking against rotation. It is also preferred that the rotationally asymmetric circumferential contour 18 extends over all or a selection of axially extending sections 12, 14, 16.

The rotationally asymmetrical circumferential contour 18 is formed differently according to different preferred embodiments. Its objective is to establish a positive locking connection with the opening AO by means of which a rotation of the fastener 1 in the opening AO is prevented. To achieve this objective, the opening AO in the first component A is formed analogously to the circumferential contour 18. Rotational asymmetric form designs for the circumferential contour 18 and the opening AO include, for example, elliptical, oval, non-circular, lemon-shaped equal to a longitudinal section through a lemon or polygonal, such as triangular, quadrangular, hexagonal, octagonal or generally polygonal.

In the first axial end portion 12, the outer sleeve 10 may include a radial collar 20. This radial collar 20 closes off the outer sleeve 10 at the first end, so that after insertion of the fastener 1 in the opening AO of the first component A, the radial collar 20 abuts on the first component A. For this purpose, the radial collar 20 extends in a radial direction beyond the edge of the opening AO.

Furthermore, it may be that the radial collar 20 is of a certain thickness in the axial direction. By this thickness, components A and B are spaced apart from each other in the fastened state in order to achieve vibration damping in the context of the reciprocal support.

It may be that the radial collar 20 comprises a radially inner round recess or cutout 22 which is arranged coaxially to a longitudinal axis L of the fastener 1 and the outer sleeve 10. A central passage opening 19 of the outer sleeve 10 has a smaller diameter than the recess 22. Therefore the recess 22 is limited in the direction of the second end portion 14 by an axial abutment face 24. In the opposite direction, i.e. axially facing away from the second end portion 14, the recess 20 is tapered by a radial inwardly projecting overhang 23. This overhang 23, which can be formed circumferentially closed or perforated at the edge of the recess 22, forms an axial, preferably flexible, undercut for a fastening flange 32 of a rotationally asymmetrical support sleeve 30 (see below).

A radial outer wall 26 of the outer sleeve 10 may comprise underneath the radial collar 20 radial projections 28 which are arranged circumferentially distributed. These projections 28 are axially limited by detents or locking or latching noses 29. The latching noses 29 support the hold of the first component A below and may be in abutment against the radial collar 20.

The opening 19 of the outer sleeve 10 extends coaxially to the longitudinal axis L of the fastener 1 and is limited by a radial inner wall 17. A contour of the inner wall 17, as seen in the cross-section of the fastener 1 (see FIG. 10), may be formed analogously to the circumferential contour 18.

In the second end portion 14 a screw sleeve 50 is arranged. The screw sleeve 50 is manufactured by injection molding as a single part or in two-component injection molding in combination with the support sleeve 30. It may be preferred to manufacture the screw sleeve 50 from plastic with the aid of additive methods. The screw sleeve 50 may be glued into, pressed in, welded in, injected or snapped with a certain amount of clearance into the second axial end portion 14 of the outer sleeve 10.

This screw sleeve 50 provides a fastening section as a screw channel 52 extending coaxially to the longitudinal axis L, in which the fastening screw 80 is screwed in to establish the connection between the first A and the second component B via the fastener 1. The screw channel 52 may extend cylindrically or conically tapered in the screwing direction R of the fastening screw 80. Since the fastening screw 80 may be equipped with a self-cutting and/or self-tapping thread 82, the self-cutting or self-tapping thread 82 cuts into the inner wall of the screw channel 52. Such threads are described in DE 10 2004 021 484 A1 and DE 10 2016 101 910, which are hereby incorporated by reference with regard to the definition of the thread geometry. It is also possible to equip the screw channel 52 with an inner thread matching the fastening screw 80.

The screw sleeve 50 is manufactured by injection molding according to the above-mentioned embodiments (see above). In 2K injection molding (two-component injection molding), the outer sleeve 10 is injection-molded in just one injection mold with a first plastic shot (step I). Subsequently, the screw sleeve 50 is molded by a second plastic shot in the same injection mold (step II), so that it is firmly arranged in the second end portion 14 of the outer sleeve 10 (step III). It may be preferred to change the order of these manufacturing steps. According to another embodiment, the screw sleeve 50 is a prefabricated insert that is formed, pressed or glued into the second end portion 14 of the outer sleeve 10 (step III). It is also preferred that the outer sleeve 10 and the screw sleeve 50 are injection-molded separately from each other (I, II) and subsequently fastened to each other.

For fastening, the screw sleeve 50 may have a fastening portion 54 with a radially outer fastening wall 55. The fastening wall 55 may extend conically in the screw-in direction R and/or is adapted to one of the above mentioned fastening methods.

The fastening portion 54 may form an axial abutment face 56. This axial abutment face 56 serves to abut and support the support sleeve 30 in the established connection (see below and FIG. 3).

A telescopic portion 58, which forms a part of the screw channel 52 in its interior, may adjoin the abutment face 56. A radial outer side of the telescopic portion 58 is spaced apart from the inner wall 17 of the outer sleeve 10, so that a receiving gap 59 is created. When connecting the two components A, B, the receiving gap 59 receives at least a part of the support sleeve 30 in order to stabilize the fastener 1.

The length of the telescopic portion 58 may be adapted to a length of the support sleeve 30, starting at the abutment face 56 up to its end or front face 57. At this, the length of the support sleeve 30 is measured only in its sleeve portion excluding the fastening flange 32. The length of the telescopic portion 58 may be equal to the length of the support sleeve 30, so that, in the established connection, the support sleeve 30 is supported on the abutment face 56 and the end face 57 of the telescopic portion 58 is supported on the fastening flange 32. It is also preferred to choose other lengths for the support sleeve 30 and the telescopic portion 58 as long as the rotation-proof connection between the screw sleeve 50 and the support sleeve 30 is ensured.

In order to ensure sufficient stability of the fastener 1 within the connection, the cross-sectional contour of the support sleeve 30 and the telescopic portion 58 is formed analogously to the circumferential contour 18 of the outer sleeve 10, as shown in FIG. 10. It is also preferred that the adjacent contours of the telescopic portion 58 and the support sleeve 30 as well as the support sleeve 30 and the outer sleeve 10 are designed differently than the circumferential contour 18. Here, forms of prisms, non-round shapings and other non-rotationally symmetrical designs are possible. It is also preferred to limit these rotation-proof coupling designs to an axial subportion of the respective component, as long as the desired function is realized.

Figure 7:
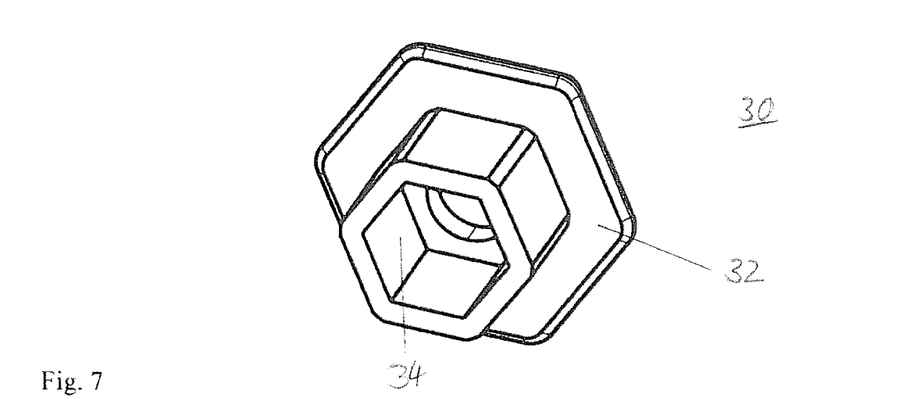
FIG. 7 is a perspective illustration of an embodiment of the rotationally asymmetrical support sleeve.
Figure 8:
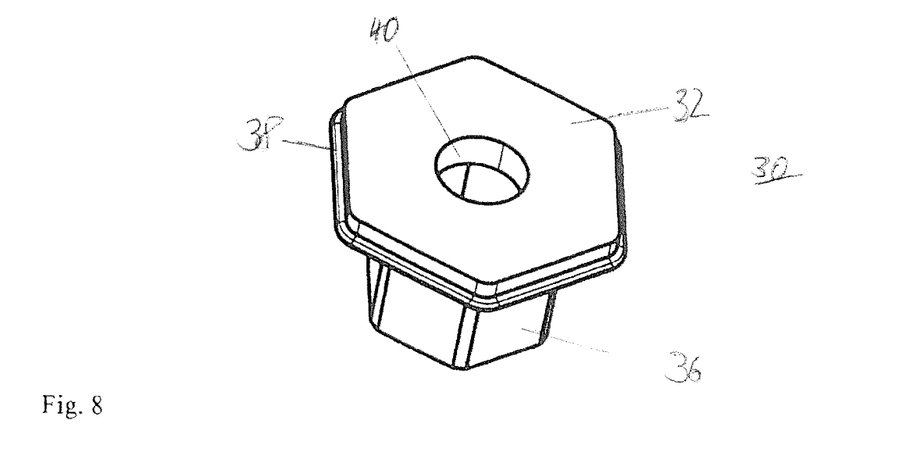
FIG. 8 is a further perspective view of an embodiment of the rotational asymmetric support sleeve according to FIG. 7.
Figure 9:
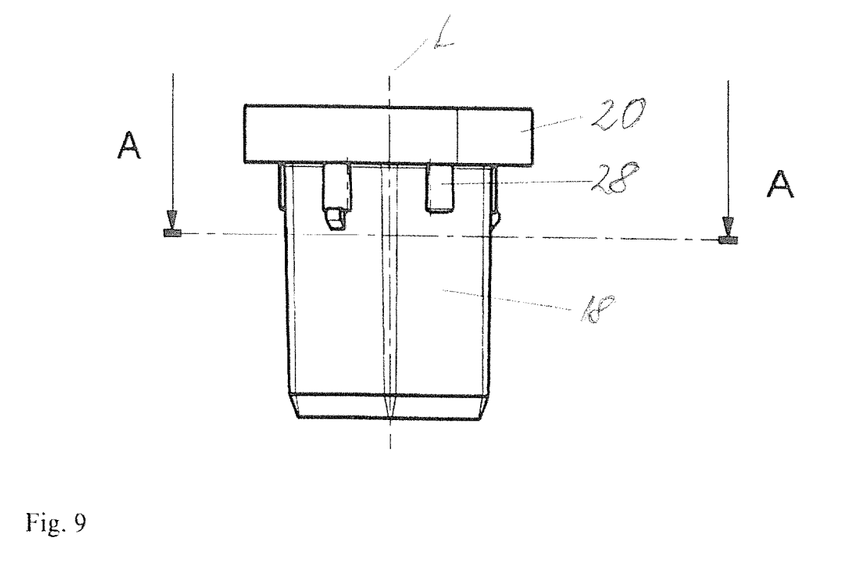
FIG. 9 is a side view of the fastener according to FIG. 1 without components and fastening screw.

The support sleeve 30, which is also manufactured by injection molding (step IV) according to a preferred embodiment of the present invention, is shown in greater detail in FIGS. 7 and 8. The fastening flange 32 has a radial projection 38 in order to be held better behind the overhang 23 of the radial collar 20. In addition, the fastening flange 32 has an opening 40 for the fastening screw 80, which is arranged coaxially to the longitudinal axis L. The fastening flange 32 may be snapped into the recess 22 of the radial collar 20 to pre-assemble the fastener 1. The fastening flange 32 also has a rotationally asymmetrical form in order to enable a preferably rotation-proof arrangement of the fastening flange 32 in the radial collar 20. Furthermore, if one screws the fastening screw 80 lightly into the screw channel 52, the fastener 1 is provided in a transport-safe, pre-assembled unit.

The support sleeve 30 consists of a fiber-reinforced plastic. According to a further embodiment, the support sleeve 30 consists of a material with a stress at failure of at least 100 MPa and a modulus of elasticity of at least 6000 MPa. A PA66-GF (polyamide 66 with glass fiber reinforcement) may be used among other things.

The plastic material of the screw sleeve 50 may have a modulus of elasticity in the range from 1000 to 2000 MPa. A suitable material is polypropylene (PP), for example. The outer sleeve 10 may consist of a thermoplastic polyolefin vulcanizate (TPV) with a hardness of 70 to 80 Shore A. The outer sleeve 10 may consist of a thermoplastic polyolefin vulcanizate (TPV) with a hardness of 70 to 80 Shore A. TPV is a mix of a polyolefin-based plastic (such as PP) and an elastomer such as EPDM. In contrast to TPO, the elastomer is cross-linked or vulcanized at TPV. By vulcanizing elastomers in TPV, TPV comes closest to conventional rubber in terms of mechanical properties. This is particularly expressed in the very good compression properties. TPV is also temperature-resistant and is therefore suitable for static and (semi-)static seals.

In order to fasten component B to component A, the fastener 1 with the screw sleeve 50 and the pre-assembled support sleeve 30 is first inserted in the opening AO, and may be positive-lockingly held against rotation (S1). In this context, it may also be preferred that the support sleeve 30 and the screw sleeve 50 are connected to each other via connection webs or frictional engagement from the injection molding methods. After component B has been arranged on the radial collar 20 (S2), the fastening screw 80 is screwed through the opening 40 into the screw channel 52 (S3). The fastening screw 80 comes into abutment with component B when being screwed into the screw channel 52 and subsequently pulls the screw sleeve 50 in the direction of the support sleeve 30. After or while the above-mentioned connection webs are destroyed or a frictional engagement between the support sleeve 30 and the screw sleeve 50 is overcome, the support sleeve 30 and the telescopic portion 58 are telescopically slid or moved into each other. The rotation-proof connection between the support sleeve 30 and the telescopic portion 58 of the screw sleeve 50 established with the manufacture of the fastener 1 already ensures that the outer sleeve 10 is protected against rotation about the longitudinal axis completely or at least in a rotation angle range<180°, further preferably <90°. In order to be able to withstand the screw-in torque of the fastening screw 80, the fastener 1 supports itself in a positive-locking manner by means of the opening OA at the component A and/or in a frictionally engaging and positive-locking manner by means of the arrangement of the fastening flange 32 in the radial collar 20 and the support at the component A. It may be further preferred that the support sleeve 30 supports itself on the abutment face 56 and the telescopic portion 58 supports itself on the fastening flange 32. During this telescope-like movement, the folding 16 is formed on the outside of the outer sleeve 10. In the connection established, component A is clamped between the folding 16 and the radial collar 20, while component B is clamped between the screw head and the radial collar 20.

The invention claimed is:

1. A fastener having a damping function, with which at least a first and a second component can be connected via a screw connection, comprising the following features:
   a. an elastically deformable outer sleeve having a screw-in opening in a first axial end portion and a fastening section for a screw in a second axial end portion, wherein the outer sleeve comprises, at least in the first axial end portion, a rotationally asymmetrical circumferential contour with which a positive locking against rotation can be established in a component opening adapted to the circumferential contour of the outer sleeve, and
   b. a rotationally asymmetrical support sleeve,
      b1. which is positive-lockingly arranged against rotation relative to the outer sleeve within the outer sleeve in the first axial end portion, so that the circumferential contour of the elastically deformable outer sleeve is supported in the first axial end portion at least in certain areas in a form-maintaining manner, and
      b2. which is positive-lockingly connected to the fastening section arranged firmly in the second axial end portion against a relative rotation between the first and the second axial end portion of the outer sleeve.

2. The fastener according to claim 1, the fastening section of which is arranged rotation-free at least with a subportion radially within the support sleeve and can be displaced in the axial direction of the support sleeve relative to the support sleeve.

3. The fastener according to claim 1, the outer sleeve of which comprises in the first axial end portion a radial collar and in the second axial end portion opposite the first a fixedly arranged screw sleeve, which comprises the fastening section in which a thread of the screw can be received.

4. The fastener according to claim 3, the screw sleeve of which comprises a screw channel extending coaxially to the outer sleeve, which is formed cylindrically or conically tapered in a screw-in direction.

5. The fastener according to claim 3, the screw sleeve of which comprises a radial outer contour at least two-stepped in the axial direction including a fastening portion facing away from the support sleeve and a telescopic portion facing the support sleeve, wherein the telescopic portion has a smaller radial extension than the fastening portion and an inner axial channel of the support sleeve.

6. The fastener according to claim 5, in which the fastening portion and the telescopic portion of the screw sleeve are connected with each other.

7. The fastener according to claim 5, in which an outer contour of the telescopic portion of the screw sleeve is adapted in shape to an inner contour of a radial inner wall of the support sleeve, so that the support sleeve blocks the screw sleeve against rotation and the outer sleeve can be compressed in axial direction torsion-free about a longitudinal axis.

8. The fastener according to claim 1, the outer sleeve of which comprises a non-circular or elliptical or hexagonal or octagonal circumferential contour in at least the first end portion.

9. The fastener according to claim 8, in which an inner wall contour of the outer sleeve is formed analogously to the circumferential contour.

10. The fastener according to claim 9, in which the support sleeve is formed at its radial outer wall to match the inner wall contour of the outer sleeve.

11. The fastener according to claim 1, in which the support sleeve provides an axial abutment face in the direction of the second axial end portion at the fastening portion, which limits an axial shortening of the outer sleeve and an accompanying folding transverse to a longitudinal axis of the outer sleeve by the screw connection.

12. Connection of at least a first and a second component with the fastener according to claim 1 in which a screw connection holds the components and the fastener together.

13. The connection according to claim 12, in which the at least one component comprises a rotationally asymmetrical opening adapted to the rotationally asymmetrical circumferential contour of the outer sleeve, in which the outer sleeve is arranged positive-lockingly against rotation.

14. The connection according to claim 12, in which the at least one first component is held between a radial collar and a folding of the elastically deformable outer sleeve and the at least one second component is held between the radial collar and a head of a screw screwed into the fastener.

15. Connection method of at least one first component having a rotationally asymmetric opening and at least one second component with a fastener according to claim 1 which comprises the following steps:
   i. inserting the fastener into the opening of the at least one first component so that the fastener is held in a positive-locking manner against rotation in the opening,
   ii. arranging the at least one second component with a fastening opening adjacent to the fastener and
   iii. screwing-in of a screw into the fastener and through the fastening opening and the opening of the components until the first component is fastened between a radial collar and a folding of the outer sleeve and the second component is fastened between a head of the screw and the radial collar of the outer sleeve.

16. The connection method according to claim 15, wherein, during screwing-in of the screw into a fastening section in the second axial end portion of the outer sleeve, the fastening section is positive-lockingly held against rotation in the support sleeve and is displaced in the axial direction of the support sleeve within the support sleeve.

17. The connection method according to claim 15, wherein, during screwing-in, the outer sleeve is shortened until the support sleeve supports itself against an axial abutment face of the screw sleeve.

18. The connection method according to claim 15, in which a thread-cutting or thread-tapping screw is screwed into a fastening section of the outer sleeve.

19. Manufacturing method for a fastener according to claim 1, comprising the following steps:
   i. manufacturing an outer sleeve from an elastically deformable material having a rotationally asymmetric circumferential contour by means of an injection molding method or an additive manufacturing method,
   ii. manufacturing a screw sleeve by means of injection molding or an additive manufacturing method and fastening the screw sleeve in the outer sleeve, iii. manufacturing a rotationally asymmetric support sleeve adapted in shape to the outer sleeve, which consists of a material having a lower deformability than the outer sleeve, by means of an injection molding method or an additive manufacturing method, and iv. arranging the support sleeve in the outer sleeve.

20. The manufacturing method according to claim 19, in which at least the outer sleeve and the screw sleeve are manufactured in a two-component injection molding method.

21. The manufacturing method according to claim 19, in which the support sleeve and the screw sleeve are manufactured as a detachable composite, wherein the composite is realized by frictional engagement between the support sleeve and the screw sleeve or by destroyable connection webs.

* * * * *